(No Model.)
E. O. GOSS.
PNEUMATIC TIRE VALVE.
No. 542,472. Patented July 9, 1895.
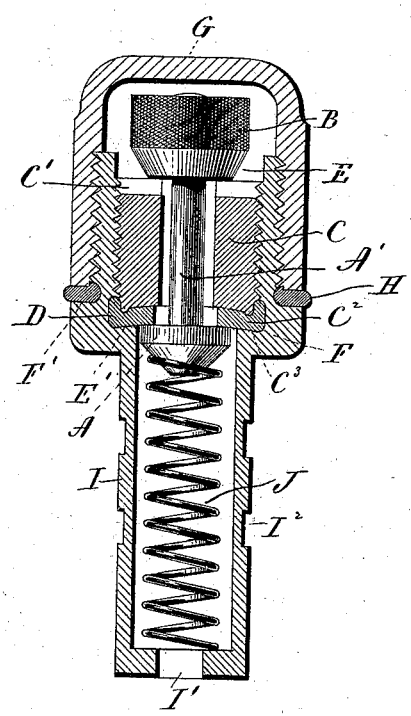

UNITED STATES PATENT OFFICE.

EDWARD O. GOSS, OF WATERBURY, CONNECTICUT, ASSIGNOR TO THE SCOVILL MANUFACTURING COMPANY, OF SAME PLACE.

PNEUMATIC-TIRE VALVE.

SPECIFICATION forming part of Letters Patent No. 542,472, dated July 9, 1895.

Application filed July 16, 1894. Serial No. 517,667. (No model.)

*To all whom it may concern:*

Be it known that I, EDWARD O. GOSS, of Waterbury, in the county of New Haven and State of Connecticut, have invented a new Pneumatic-Tire Valve; and I do hereby declare the following, when taken in connection with the accompanying drawing and the letters of reference marked thereon, to be a full, clear, and exact description of the same, and which said drawing constitutes part of this specification, and represents a view in central longitudinal section of one form which a valve constructed in accordance with my invention may assume.

My invention relates to an improvement in that class of valves particularly designed for the inflation and deflation of the pneumatic tires of bicycles, the object being to produce at a low cost a simple, convenient, and effective valve composed of few parts and not liable to derangement.

With these ends in view my invention further consists in a valve having certain details of construction and combinations of parts, as will be hereinafter described, and pointed out in the claim.

As herein shown, the valve proper A has a tapering inner face and a straight outer face, and is provided with a stem A', the outer end of which is threaded to receive the knurled adjusting-nut B, the inner face of which bears upon the outer end of the removable annular plug C, the inner end whereof impinges upon and holds in place the annular packing-washer D, against which the square outer face of the valve proper bears. The central opening of the plug is considerably larger in diameter than the diameter of the valve-stem, so as to form an air-passage around the same. The valve proper, it will be noted, is smaller in diameter than the diameter of the plug. The said plug C is externally threaded to take into a corresponding thread formed upon the inner wall of the circular chamber E, formed in the head F of the body of the valve, and having the said washer located in its bottom. The valve proper being smaller in diameter than the said chamber and plug, may therefore be passed through the said chamber in either direction. The outer end of the plug has a diametrical slot or groove C' formed in it to receive a screw driver for introducing the plug into and removing it from the said chamber, as well as adjusting it therein. The lower end of the plug is slightly concave, as at $C^2$, and furnished near its outer edge with an annular rib $C^3$, which bites into the outer edge of the packing-washer D and tends to push the same outward against the extreme inner end of the side wall of the chamber E and downward against the slightly-convex bottom wall E' of the same. Under this construction the packing-washer D fulfills the two-fold function of forming a packing between the body of the valve and the plug and a seat for the valve proper.

The head F of the body of the valve is externally threaded to receive the internally-threaded dust-cap G, the inner end of which seats against an annular washer H, which rests upon an annular seat F', located near the inner end of the head. The said valve-body also comprises an integrally-formed hollow shank I, formed integral with the head F, communicating with the chamber thereof and containing a spiral spring J, which at its outer end impinges against the valve proper and forces the same against the packing-washer D, while its inner end rests against the inner end of the hollow shank over an opening I', formed therein for communication with the hollow tire, which is not shown. The said shank I has circumferential grooves $I^2$ formed in it to facilitate its attachment to the inflation-tube, in which it is located.

It will be understood, of course, that my improved valve is used in the ordinary manner, the dust-cap being removed, the nut loosened, and the end of the tube of the air-pump screwed upon the head of the body of the valve in place of the cap. Then when the tire has been inflated the tube is removed and the nut tightened again, so as to pull the valve up against its packing-washer, after which the cap is replaced.

By using the removable plug I am enabled to very conveniently assemble and dismember the valve. Thus it will be seen that by removing the plug I am enabled to gain access to the valve proper, the packing-washer forming its seat and the valve-spring. I have already spoken of the resulting cheapness from utilizing one washer for packing both the valve and the plug.

I would have it understood that I do not limit myself to the exact construction herein shown and described, but hold myself at liberty to make such changes and alterations as fairly fall within the spirit and scope of my invention.

Having described my invention, what I claim as new, and desire to secure by Letters Patent, is—

In a valve for pneumatic tires, the combination with a valve-body comprising a head and a hollow shank, the former being externally threaded and containing an internally threaded circular chamber, and the latter opening into the inner end of the said chamber; of an externally threaded annular plug located in the said chamber, a packing washer located in the bottom of the said chamber, and held in place by the plug which forces it against the bottom wall thereof, a valve proper located within the inner end of the hollow shank, bearing against the said washer, and constructed with a stem which passes outward through the central opening of the said plug, an adjusting nut applied to the outer end of the valve stem, and bearing against the outer end of the plug, a spring located in the said hollow shank, and interposed between the outer end thereof and the valve, which it exerts a constant effort to force against the said washer, and a dust-cap applied to the external threads of the head of the valve-body, substantially as set forth.

In testimony whereof I have signed this specification in the presence of two subscribing witnesses.

EDWARD O. GOSS.

Witnesses:
C. M. DE MOTT,
CHAS. FEHL.